Nov. 18, 1969  G. BROSZAT  3,479,629
WINDING ARRANGEMENT FOR DISTRIBUTING SURGE VOLTAGE
Original Filed April 5, 1966  3 Sheets-Sheet 1
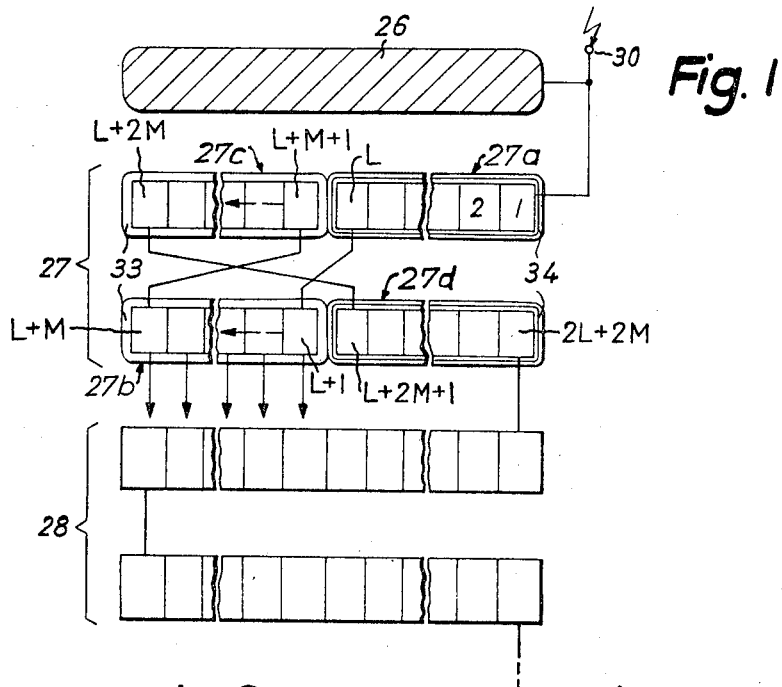
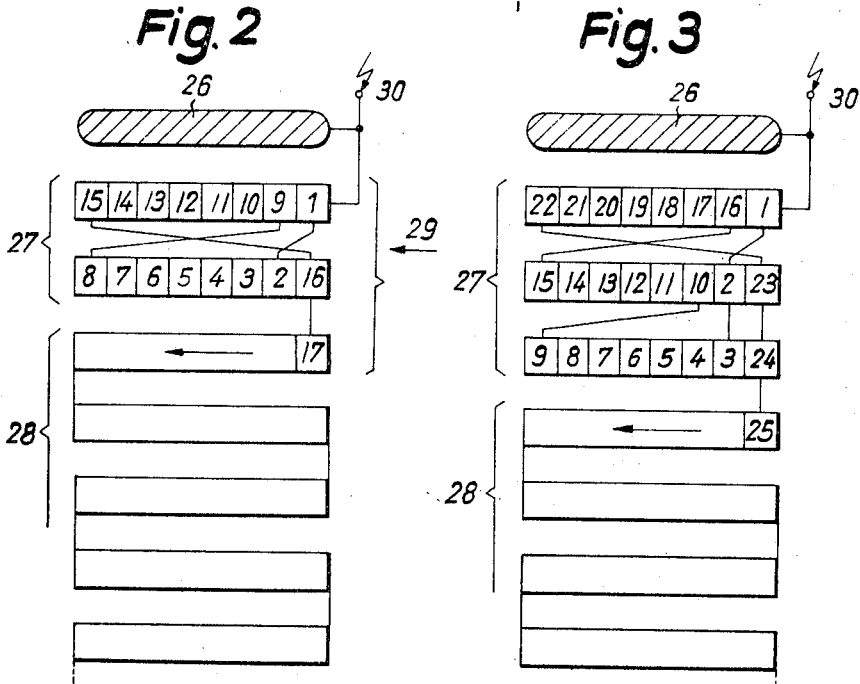
Inventor:
Gottfried Broszat
By: Spencer & Kaye
Attorneys Nov. 18, 1969          G. BROSZAT          3,479,629

WINDING ARRANGEMENT FOR DISTRIBUTING SURGE VOLTAGE

Original Filed April 5, 1966          3 Sheets-Sheet 2

Inventor:
Gottfried Broszat
By: Spencer & Kaye
Attorneys

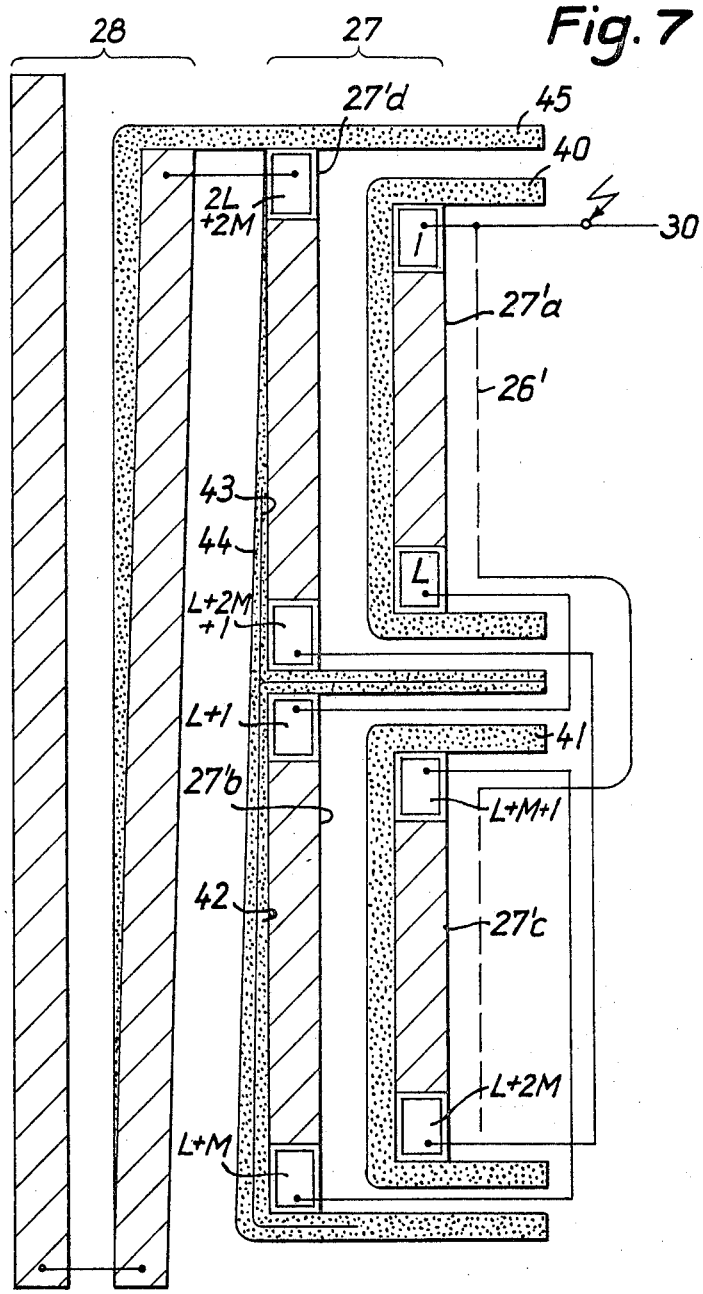

United States Patent Office 3,479,629
Patented Nov. 18, 1969

3,479,629
WINDING ARRANGEMENT FOR DISTRIBUTING SURGE VOLTAGE
Gottfried Broszat, Hegnach, Germany, assignor to Licentia Patent-Verwaltungs G.m.b.H., Frankfurt am Main, Germany
Continuation of application Ser. No. 540,265, Apr. 5, 1966. This application Aug. 22, 1968, Ser. No. 755,512
Int. Cl. H01f 15/14, 15/04
U.S. Cl. 336—70                                        11 Claims

ABSTRACT OF THE DISCLOSURE

A winding arrangement, for use in transformers and choke coils which has a minimum number of soldering junctions between individual coils and which flattens the applied voltage waveform so that the surge voltage stress between the coils is reduced. The winding arrangement comprises a plurality of normally wound main coils and at least two, but not more than three, specially wound so-called preliminary coils connected in series with the main coils. The main coils have windings which spiral in one direction only, the winding ends terminating at the beginning and end of the spiral and being connected together with a soldering junction so that the main coils are connected in series. The preliminary coils, which effect the flattening of the voltage wavefront, are connected so that a portion of a first coil is in series with a portion of a second coil. The first coil is arranged on the outside of the winding arrangement and the second coil immediately inside of the first.

---

This application is a continuation of application Ser. No. 540,265, now abandoned, filed Apr. 6, 1966.

The present invention relates to a winding arrangement for use in transformers and choke coils, and more particularly to windings in the form of disc-shaped coils, generally known as pancake coils, and those windings in the form of layers.

In order to improve the distribution of the surge voltage in such windings, it is known to provide additional shields or screening at the input to the winding and in conjunction with such shields, different types of windings may be provided. The different types of windings generally are formed by interpositioning the turns or the coils to form different circuits with the desired interpositioning being maintained from the beginning to the end of the entire winding. For example, in a prior art double coil circuit, the interpositioning is such that coils are successively arranged with respect to each other in a specific spatial sequence and are galvanically connected with each other in a different sequence so that several similar coil groups are formed which are connected in series with respect to the entire winding. Also, there are many arrangements wherein the turns are continuously interpositioned rather than the coils. Such "continuous turn interpositionings" have become known as "interleaved windings" and provide a marked increase in the series capacity of the entire winding over that of the coil interpositionings which is uniform in all of the winding sections, so that the surge voltage stress between the coils is reduced.

It has been proposed to make all of the pancake coils from two interwoven turns each and to connect the turns in series with each other so that two coil paths are formed having the same winding direction. Two of such multiple coils which are connected in the same winding direction result in a single coil connection, whereas two coils connected in opposite winding directions result in a double coil connection. Such multiple coils have become known in the art and are connected with each other in many variations with the sense or direction of winding of the individual coils or the sequence thereof being varied according to the desired circuitry, but always in such a manner that the windings are interpositioned periodically from beginning to end for specific coil groups.

All of these known windings have the disadvantage that each interpositioning requires at least one and generally several soldering joints so that the entire winding is provided with soldered junctions from the beginning to the end thereof. These joints necessitate a considerable expenditure with respect to the manufacture of the winding and also represent weak points in the winding. This results from the fact that a soldering joint is more difficult to insulate and an increased voltage is produced due to the interpositioning between adjacent turns, which voltage amounts to a multiple of the normal winding voltage. Therefore, statistically, a possibility of an error in the manufacture is very great, in view of the fact that these highly stressed weak points occur continuously throughout the entire winding.

Furthermore, it is also known to provide means for increasing the surge voltage at the input to the winding and to connect the successive windings in a normal manner. For example, the provision of a shielding ring in front of the winding and connected to the input thereof, increases the capacitive coupling of the entering surge voltage to the turns of the coil adjacent to the guard ring. It has also been proposed to provide additional screening or shielding turns at the input for further increasing the coupling capacity. If such turns are considered as a part of the coils positioned in the input region, these input coils would be constructed differently from the subsequent normally constructed and connected coils and are herein referred to as "preliminary coils." Also, it is known in the art to provide a winding arrangement wherein several coils are connected in series ahead of the input to a normally wound pancake coil having a single or double coil connection with one of each of the coils being provided with the input potential. The coils are so connected that the same voltage difference exists between two preliminary coils which are adjacent to each other and along the radial extension thereof, whereas the voltage differences between different pairs of preliminary coils are at least partially different. This arrangement has the disadvantage that, in order to provide the preliminary coil connections, that electrical connections must be placed on the exterior of the winding which positioning is extremely inconvenient since these connections have to be insulated separately. Furthermore, this positioning renders the cooling of the entire winding and the insulating construction as well as the manufacture thereof more difficult. It is also possible to provide the preliminary coils at the input in the form of a single coil connection so that although such coils receive the highest portion of the surge voltage, the coils are exposed to sufficiently low surge stresses and are connected with the following main coils formed as normal double coils. Although it is true that with such preliminary coils, the effect of the surge voltage stress on the preliminary coil itself is lower than that of the following main coils, the aforementioned arrangement does not result in the main coils themselves undergoing an effective reduction of the surge voltage stress.

It is therefore an object of the present invention to provide a winding arrangement which overcomes the disadvantages of prior art arrangements.

It is another object of the present invention to provide a winding arrangement having a reduced number of soldering junctions and weak points.

It is a further object of the present invention to provide a winding arrangement wherein the waveform of the surge voltage is flattened in the preliminary coils and conducted in this form to the main winding.

In accordance with the present invention, the coil arrangement is such that the weak points such as the soldering junctions are confined to a small number of preliminary coils; in particular, either two or three. Furthermore, it is not the series capacity of the entire winding which is continuously increased, but rather the waveform of the surge voltage entering the preliminary coils is flattened in the preliminary coils and conducted in this form to the following main winding. This flattening is provided only in the few preliminary coils connected in series in front of the normal coils, that is, the noninterleaved main coils of the winding so that only in the preliminary coils will there be soldering junctions and special connections having weak spots and, respectively, increased surge stresses between adjacent turns.

In accordance with the present invention, there is provided a winding arrangement comprising coils which are interleaved and which serve as the preliminary coils and are in turn connected to the main coils of the winding arrangement, these coils being in the form of pancake or layer coils. Furthermore, a screening or a shielding member is provided in front of the first preliminary winding and is capacitively coupled and galvanically connected to such winding. Thus, the waveform representing the surge voltage is flattened and the surge current enters the preliminary coils at two spaced points, since the current is conducted as a capacitive surge current to the end of the outer preliminary coil section via the shielding ring which is connected to the input, and the current is also conducted to a preliminary coil disposed interiorly of the preliminary coil section and which coil is galvanically connected with the shielding ring having the input potential applied thereto. The voltage waveform for both surge currents have a high degree of steepness, but the waveforms differ, and thereby effect a compensation of the two entering surge currents so that the waveform of the voltage conveyed to the main coils by the last preliminary coil connected to the main winding is flattened and this flattened waveform has been confirmed by many measurements. The flattened surge wave penetrates the main coil winding which is connected in a normal single or double coil manner and produces considerably lower surge voltage differences between adjacent coils than would be the case without the measures proposed by the present invention. Therefore, the coil insulation for the main coil may be considerably reduced and, respectively, the ability of the entire winding to withstand the surge voltage without a breakdown of the winding is considerably increased. It is particularly advantageous to arrange the current flow such that the current flows through the majority of the interleaved windings of two preliminary coils in the same direction since, in this case, the mutual capacitive coupling between such preliminary coil windings are uniform and particularly effective.

Additional objects and advantages of the present invention will become apparent upon consideration of the following description when taken in conjunction with the accompanying drawings in which:

FIGURE 1 is a schematic representation of a pancake coil arrangement in accordance with the present invention.

FIGURE 2 is a schematic representation of a coil arrangement wherein the coils are interleaved in a different manner.

FIGURE 3 is a schematic representation of a pancake coil arrangement having three preliminary coils.

FIGURE 7 is a schematic representation of a layer coil arrangement in accordance with the present invention.

Figure 4:
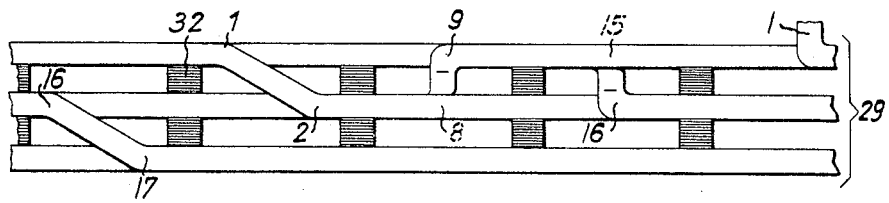
FIGURE 4 is a lateral view taken in the direction of arrow 29 on FIGURE 2 and shows the preliminary coils wound with a single conductor wire.

Referring now to the drawings, there is shown in FIGURE 1 a winding arrangement according to the present invention and having a shielding ring 26, two preliminary coils 27 and main winding coils 28. Both the shielding ring 26 and the first coil 1 of the preliminary coils 27 are galvanically connected to the input 30. As shown, the preliminary coils are arranged in two sections which are insulated from each other by insulation 33 and 34, respectively. In this embodiment of the present invention, the preliminary coils are wound in the same direction which effectively aids in achieving the objects of the present invention. It should be noted, that the drawing represents a cross section through one-half of a circular winding arrangement. Accordingly, each of the winding sections is disc-like or pancake in shape.

The input 30 which is galvanically connected to the guard ring 26, also galvanically connects the input potential over L integral turns of the preliminary coil section 27a, which is adjacent to the shielding ring 26. According to the present invention, the output of the L turn coil section 27a is connected with the second preliminary coil from the exterior of the preliminary coil section to the interior thereof. That is, the preliminary coil section 27b which is galvanically connected to section 27a is disposed to the inside of the coil section 27a. The section 27b is provided with M turns and the current traverses this section in the direction of the dashed arrow from $L+1$ turns to $L+M$ turns. These M turns capacitively couple in the direction of the solid arrows to the first coils of the following main coils 28. The coil section 27b is then galvanically connected to the coil section 27c disposed to the outside of section 27b. The section 27c is also provided with M turns and the current traverses from $L+M+1$ turns to $L+2M$ turns. From the section 27c, the current is galvanically conducted to section 27d having L turns and the current traverses this section from $L+2M+1$ turns to $2L+2M$ turns. After the current traverses the $2L+2M$ turns of section 27d, there is an inductive connection to the following main coil 28. By virtue of the two coil connections of the $L+M$ with the $L+M+1$ turns and of the $L+2M$ with the $L+2M+1$ turns, both preliminary coil sections 27b and 27c having M turns are traversed by the surge current in the same direction so that these M axially adjacent turns of both preliminary coils have the same voltage difference of M turns at all times. These two M turn sections may be equally strongly insulated because of the same axial voltage stress. This results in a uniformly good capacitive coupling along the radial extension of the M turns between both preliminary coils which effectively enters into the total behavior of the preliminary coils and particularly if $M \gg L$ is chosen. The other turns will also be insulated more strongly in accordance with the higher surge stresses occurring in the preliminary coils. The insulation between these sections can be obtained by means of insulating tapes 33 and 34 which when wound about the coils causes only a slight radial extension of the coils. Thus, the effect according to the present invention if $M > L$, is that almost all of the turns of the second preliminary coil being positioned to the inside of the first preliminary coil are traversed by the surge current ahead of the majority of the M turns of the outer first preliminary coil.

Accordingly, the preliminary coils of the present invention are intended to have the same effect as a series inductance connected in front of the main coil so that a very steep surge voltage waveform entering the preliminary coil is considerably flattened at the output of such coils which output is also the input of the main coils. In addition, the preliminary coils provide an additional coupling capacity for increasing the series capacity in the beginning of the coil section since the entering surge voltage penetrates, by virtue of the galvanic connections of the preliminary coil, rapidly into the interior of the preliminary coil section and from there, the increasing surge current is capacitively directly coupled to turns of the winding through which the inductive surge current flows at a later time due to the electrical connections thereto. These effects are achieved according to the present invention if the preliminary coils are arranged so that the inductive surge current flowing from one turn to successive adjacent turns traverses almost all of the turns of a preliminary coil section which is positioned away from the shielding ring and to the inside of an outer coil section before the surge current traverses all of the turns of the outer coil section. Thus, as shown in FIGURE 1, there is provided a pancake coil winding for transformers and choke coils wherein at the end face or outer region of the coil arrangement, for the purpose of improving the distribution of the surge voltage, only a few preliminary coils are connected to the winding input, as compared with the number of coils in the normally connected main coils. Furthermore, the electrical connection from the input source is effected over an integral number or non-integral number of turns of the preliminary coils which are spaced adjacent to the winding end face and shielding ring, with these turns then being galvanically connected to a preliminary coil positioned to the inside of the outer preliminary coil.

In FIGURE 2, there is shown another coil arrangement according to the present invention wherein the number of L turns is $L>0\leq 1$, that is, the galvanic connection from the input 30 is made over a complete or partial turn 1 of the first preliminary coil which is adjacent to the shielding ring 26 and the end of this turn 1 is connected to the second preliminary coil positioned to the inside of the preliminary coil section 27. Thus, in keeping with the objects of the present invention, the surge current traverses coil portions 2 to 8 of the interior preliminary coil, 9 through 15 of the outer preliminary coil and then coil part 16 of the inner preliminary coil. It is readily apparent from the afore-described arrangements that connecting lines positioned outside of the coils are rendered superfluous and that, moreover, an increase capacitive coupling exists due to the fact that the turn 1 is closely capacitively connected to the turn 9 and the turn 2 is capacitively coupled closely to the turn 16.

In accordance with the present invention, it is possible, for the purpose of controlling the increased turn stresses arising from the close coupling, to provide more insulation for the turns 1 and 16 and to additionally tape the preliminary coil portions 2 through 8 and also 9 through 15 separately with insulation.

Figure 6:
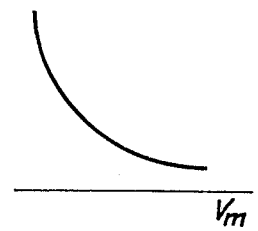
FIGURE 6 is a curve representing the relationship between the stress voltage and the surge voltage.

FIGURE 3 illustrates a further embodiment of the present invention having three preliminary coils 27. The galvanic connection to the input 30 is effected over the complete or partial turns 1 and 2. The end of the turn 2 is galvanically connected to with the third preliminary coil positioned at the inside of the preliminary coil section 27 and thus, effective capacitive coupling takes place between this third coil and the inwardly spaced following main coil of the main coil section 28, with the turn 24 of the third coil being galvanically connected to turn 25 of the main coil section. The surge voltage $V_s$ constantly decreases over the first 23 turns of the preliminary coil section which are generally axially adjacent turns, until turns 24 and 25. The higher the surge voltage $V_s$ the more effective is the reduction of the surge stress V in the following normally wired main coils, and the higher is, for example, also the maximum surge voltage $V_m$ within all of the preliminary coils. FIGURE 6 shows this relationship between the surge stress V and the maximum surge voltage $V_m$ and the curve of this figure generally represents the voltage waveform relationship at the critical points 3 and 24, 2 and 23, 1 and 16 and at the radial connections within the preliminary coil section 27. Thus, only these critical points which have the highest stress need therefore be insulated more strongly with respect to each other. The insulation for the remaining turns may be relatively weak. In accordance with FIGURE 6, the arrangement selected and, respectively, the required number of turns will be coordinated to the rating for the surge voltage for the type of insulation chosen. In FIGURE 3, the further connections between the different preliminary coils are obtained through the complete turns 23 and 24. In the arrangement of FIGURE 3 as well as FIGURE 2, the preliminary coils are traversed by current in the same direction of the winding as shown by the arrows within the coils.

FIGURE 4 is a lateral view taken in the direction of the arrow 29 in FIGURE 2 and shows the winding of the turns in the preliminary coil for a single conductor wire. The transition points between coil turns are clearly visible in this figure.

Figure 5:
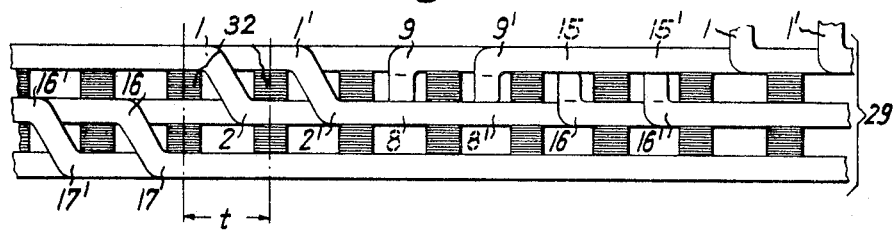
FIGURE 5 is a lateral view taken in the direction of arrow 29 of FIGURE 2 and shows the preliminary coils wound with a pair of parallel conductor wires.

FIGURE 5 is a lateral view, again in the direction of the arrow 29 in FIGURE 2, and showing the winding for a preliminary coil section wherein the winding comprises two parallel wires per turn. The individual turns in both FIGURES 4 and 5 are designated with reference numerals 1 to 16 and in FIGURE 5 the parallel extending wires are designated with reference numerals 1' to 16'. As shown in FIGURE 5, the two parallel wires forming the turns 1 and 1' are not converted into the turns 2 and 2', etc., at the same circumferential point by being connected with each other, but instead form the successive turns at circumferential points which are displaced by approximately one divisional width $t$. As shown in FIGURES 4 and 5, spacer blocks 32 are provided within the coils for forming cooling ducts between the individual coils. As a result, the radial spacing of the connecting points for the same numbered turns becomes only as wide as the width $t$, which is the center to center distance between the spacer blocks 32. The winding connections for FIGURES 2 and 3 of which FIGURES 4 and 5 represent lateral views of FIGURE 2 are such that the preliminary coils are traversed by current flowing in the same direction. The winding arrangement may be such that the current traverses the coils in different directions and while the capacitative coupling within the preliminary coils is not as effective in this arrangements, the cool connections are then more simple.

It should be noted, that other applications of the present invention are possible in which at least two preliminary coils are connected in series at the input to a normal pancake coil winding in a single or double circuit connection and wherein one of the preliminary coils is galvanically connected to the input source for the winding. Furthermore, according to the present invention, the coils are so connected that between two preliminary coils which are adjacent to each other and along the main portion of the radial extension thereof, there will always prevail the same voltage difference, whereas the voltage differences between different pairs of preliminary coils are, however, at least partly different.

Although the present invention has up to now been described in terms of pancake coil windings, the present invention is not limited to such windings in that, in accordance with the present invention, a winding group can also be constituted by a "layer" coil. Such an arrangement is shown in FIGURE 7 and is virtually identical to FIGURE 1 so that the similar reference numerals are used in the description thereof. The difference between these two figures is that in FIGURE 1, the windings forming the winding group are spaced at varying distances from the winding axis in order to form a pancake coil whereas in FIGURE 7, the windings of the winding group are all spaced the same distances from the winding axis in that the windings are placed one above each other with the winding groups forming "layers" with respect to each other which are in the shape of cylinders. As shown, in lieu of the shielding ring 26 of FIGURE 1, there is provided a tubular shield 26'. According to the present invention, there is provided a plurality of main winding coil layers 28 comprising a plurality of conventionally connected layers, the same being shown as a double layer connection, and of a plurality of preliminary coils 27 which are less in number than the number of normal layer coils 28.

The preliminary coils are arranged in two sections, and as shown, one of the coils is provided with a section 27'a having an L turn winding and a section 27'c having an M turn winding, this coil being positioned next to the outer region or contour of the winding structure and adjacent the shield 26' so as to form the innermost or outermost layer of the winding. The section 27'a is galvanically connected to section 27'b of another preliminary coil disposed to the inside thereof such that the inner preliminary coil forms the second layer, either from the inside or the outside and includes a further preliminary coil section 27'b. As shown, the input 30 is galvanically connected to the L turns section 27'a which is connected in series with sections 27'.b through 27'd, section 27'd being galvanically connected with the main coils 28. From the input 30, the current first traverses the L turn section 27'a, then the $L+1$ to $L+M$ turns of section 27'b, the $L+M+1$ to $L+2M$ turns of section 27'c and finally the $L+2M+1$ to $2L+2M$ turns of section 27'd, the output of this latter section being galvanically connected to the main coils 28. It is readily apparent that the inner preliminary coil 27 forming the second layer of the winding may also be connected in series with still further preliminary coils which are connected between the input 30 and the main windings 28.

As further shown in FIGURE 7, heavy insulation means 40, 41, 42, 43 and 45 are provided between the individual layers, the insulation being bent over at the ends thereof to form flanges, in a manner known per se, at the ends of the layers for protecting the winding voltage peaks which occur to the adjacent layer at these ends. The thickness of the insulation means 42 to 45 increases with increasing voltage so that a "wedge-shaped" insulation is attained. Although the connections between the preliminary coils can be formed in the manner similar to that shown in FIGURE 1, FIGURE 7 shows all of these connections being located on the outside of the coil and for this purpose, the layers are subdivided into sections. In the thus formed openings between these sections, there lie the connecting lines for the windings of coil sections 27'a to 27'd and also the flanges of the insulation means 41 to 44.

The normal layers of the main windings 28, of which only two are shown, have no layer connections which would have to be soldered as in the case of the preliminary coils. Instead, they may be wound continuously without soldered connections and such continuously connected main coil layer windings having preliminary coils connected thereto in accordance with the present invention, have substantially lower double-layer surge stresses than windings without such preliminary coils. Also, it should be noted that the normally connected layers of the main windings may also be connected as individual layer sections with layer bypasses as in the preliminary coils.

Accordingly, when employing the concept of the present invention, there is provided a very effective reduction of the surge voltage stress, and a reduced insulation expenditure with the use of conventional, normally wired, soldering joint-free main coil windings to which is connected, in series, a small number of preliminary coils which provide the advantages of the present invention. It should be noted that the provision of a shielding ring 26 as shown in FIGURE 1 or a shield 26' as shown in FIGURE 7 is not necessary for the surge voltage reduction effect of the preliminary coils. In fact, the preliminary coils according to the present invention can, even without such a shield, bring about a similar and much improved surge voltage distribution between the normally wound main layers 28 than a conventionally wound arrangement with such a shield.

It will be understood that the above description of the present invention is susceptible to various modifications, changes, and adaptations, and the same are intended to be comprehended within the meaning and range of equivalents of the appended claims.

I claim:
1. A winding arrangement comprising, in combination:
   (a) first and second electrical inputs;
   (b) at least three main coils, each of which spirals in one direction only, the winding ends of each of said main coils terminating at the beginning and end of said one direction and being connected with one of the two winding ends of adjacent ones of said main coils so that said main coils are connected in series and one of the two outer main coils is connected to said first electrical input;
   (c) at least two, and not more than three, preliminary coils which are less in number than said main coils, the inner one of said preliminary coils being located adjacent to the other of said two outer main coils, and each further preliminary coil being located adjacent to the preceding preliminary coil, each of said preliminary coils including:
       (1) a principal coil portion which spirals in one direction only, having winding ends terminating at the beginning and end of said one direction, and
       (2) at least one minor coil portion having substantially fewer turns than said principal coil portion and having winding ends terminating at the beginning and end of said minor coil portion, the principal coil portion of said inner preliminary coil being connected to said second electrical input through the minor coil portions of the other ones of said preliminary coils and the principal coil portion of each further adjacent preliminary coil being connected to the principal coil portion of each preceding preliminary coil so that said principal coil portions of each of said preliminary coils will conduct current in the same direction as does said other outer main coil, the principal coil portion of the outer one of said preliminary coils being connected to said other outer main coil through the minor coil portions of the other ones of said preliminary coils.

2. A winding arrangement as defined in claim 1 wherein said at least one minor coil portion of at least one of said preliminary coils is constituted by an integral number.

3. A winding arrangement as defined in claim 1 wherein at least one minor coil portion of at least one of said preliminary coils is constituted by a non-integral number.

4. A winding arrangement as defined in claim 1 wherein each of said coils is constituted by a pancake coil.

5. A winding arrangement as defined in claim 1 further comprising first insulation means provided about said principal coil portion of said preliminary coils and second insulation means provided about said at least one minor coil portion of said preliminary coils, said second insulation means being stronger than said first insulation means.

6. A winding arrangement as defined in claim 1 and further comprising a shielding means disposed at the outer region of said winding arrangement, said shielding means being galvanically connected to said second electrical input.

7. A winding arrangement as defined in claim 1 wherein each of said coils is constituted by a layer coil.

8. A winding arrangement as defined in claim 7 and further comprising insulation means provided on said preliminary coils, said insulation being formed with flanges at the ends of said coils.

9. The winding arrangement defined in claim 1, wherein there are two preliminary coils and wherein said minor coil portion of each preliminary coil has a single turn, whereby said principal coil portion of said inner preliminary coil will be connected to said second electrical input through the single turn of said minor coil portion of said outer preliminary coil and said principal coil portion of said outer preliminary coil will be connected to said other outer main coil through the single turn of said minor coil portion of said inner preliminary coil.

10. The winding arrangement defined in claim 1, wherein there are three preliminary coils and wherein said minor coil portion of said inner and outer preliminary coil has a single turn and said minor coil portion of the central preliminary coil has two turns, whereby said principal coil portion of said inner preliminary coil will be connected to said second electrical input through the single turn of said minor coil portion of said outer preliminary coil and one of said two turns of said minor coil portion of said central preliminary coil and said principal coil portion of said outer preliminary coil will be connected to said other outer main coil through the other of said two turns of said minor coil portion of said central preliminary coil and through the single turn of said minor coil portion of said inner preliminary coil.

11. The winding arrangement defined in claim 1, further comprising first insulation means provided on said preliminary coils and second insulation means provided on said main coils, said first insulation means being stronger than said second insulation means.

References Cited

UNITED STATES PATENTS

| | | | |
|---|---|---|---|
| 2,453,552 | 11/1948 | Stearn | 336—182 |
| 3,028,569 | 4/1962 | Camilli et al. | 336—185 XR |
| 3,106,690 | 10/1963 | Angermeyer | 336—70 |
| 3,221,282 | 11/1965 | Brierley et al. | 336—69 |
| 3,246,270 | 4/1966 | Stein | 336—70 |

FOREIGN PATENTS 1,222,757  1/1960  France.

LEWIS H. MYERS, Primary Examiner

T. J. KOZMA, Assistant Examiner

U.S. Cl. X.R.

336—89